United States Patent [19]

Kong-Chan et al.

[11] Patent Number: 5,061,503

[45] Date of Patent: Oct. 29, 1991

[54] SIMULATED CHEESE PRODUCTS WITH REDUCED ANIMAL FAT AND CALORIES

[75] Inventors: Josephine L. Y. Kong-Chan, West Chester; James A. Hellyer, Milford; Michael W. Tafuri, Montgomery, all of Ohio

[73] Assignee: The Procter & Gamble Company, Cincinnati, Ohio

[21] Appl. No.: 614,055

[22] Filed: Nov. 9, 1990

Related U.S. Application Data

[63] Continuation of Ser. No. 366,566, Jun. 14, 1989, abandoned.

[51] Int. Cl.$^5$ ............................................. A23C 20/00
[52] U.S. Cl. ................................... 426/582; 426/585; 426/611; 426/804
[58] Field of Search ................ 426/582, 585, 611, 804

[56] References Cited

U.S. PATENT DOCUMENTS

| | | | |
|---|---|---|---|
| 2,604,405 | 1/1950 | Petersen | 99/116 |
| 3,164,477 | 1/1965 | Nobile | 426/36 |
| 3,502,481 | 3/1970 | Schaap et al. | |
| 3,600,186 | 8/1971 | Mattson | 426/611 |
| 3,806,606 | 4/1974 | Seiden | |
| 3,873,729 | 3/1975 | Kubota et al. | 426/40 |
| 3,917,854 | 11/1975 | Kasik et al. | 426/573 |
| 3,941,891 | 3/1976 | Kasik et al. | 426/94 |
| 3,968,169 | 7/1976 | Seiden et al. | 568/680 |
| 4,005,195 | 1/1977 | Jandacek et al. | 424/182 |
| 4,005,196 | 1/1977 | Jandacek et al. | 424/180 |
| 4,034,083 | 7/1977 | Mattson | 424/180 |
| 4,197,322 | 4/1980 | Middleton | 426/36 |
| 4,232,050 | 11/1980 | Rule et al. | 426/582 |
| 4,244,983 | 1/1981 | Baker | |
| 4,305,970 | 12/1981 | Moran et al. | |
| 4,379,175 | 4/1983 | Baker | |
| 4,397,926 | 8/1983 | Galal et al. | 426/582 |
| 4,678,676 | 7/1987 | Ishizuka et al. | 426/573 |
| 4,684,533 | 8/1987 | Kratchovil | |
| 4,710,567 | 12/1987 | Kea et al. | |
| 4,734,287 | 3/1988 | Singer et al. | 426/41 |
| 4,744,521 | 5/1988 | Singer | 241/66 |
| 4,797,300 | 1/1989 | Jandacek et al. | |
| 4,861,610 | 8/1989 | Kato et al. | 426/582 |
| 4,863,753 | 9/1989 | Hunter et al. | 426/633 |

FOREIGN PATENT DOCUMENTS

| | | | |
|---|---|---|---|
| 952761 | 8/1974 | Canada | 99/149 |
| 0121253 | 10/1984 | European Pat. Off. | |
| 0233856 | 8/1987 | European Pat. Off. | |
| 0236288 | 9/1987 | European Pat. Off. | |
| 304131 | 2/1989 | European Pat. Off. | |
| 2917086 | 11/1980 | Fed. Rep. of Germany | |
| 207070 | 2/1984 | Fed. Rep. of Germany | |
| 227137 | 9/1985 | Fed. Rep. of Germany | |
| 2612073A | 3/1987 | France | |
| 49-26220 | 3/1974 | Japan | |
| 2165134 | 4/1986 | United Kingdom | |

OTHER PUBLICATIONS

Patent Abstracts of Japan, vol. 11, No. 184 (C-427) (2631), 6/12/87.
Patent Abstracts of Japan, vol. 8, No. 184 (C-239) (1621), 8/23/84.
Patent Abstracts of Japan, vol. 10, No. 203 (C-360) (2259), 7/16/86.
U.S. Ser. No. 036,738 (Letton), filed 4/10/87.
U.S. Ser. No. 216,751 (Seiden & Woo), filed 7/8/88.
U.S. Ser. No. 329,620 (Seiden), filed 3/28/89 (Continuation-in-Part of U.S. Ser. No. 132,400, filed 12/15/89).

*Primary Examiner*—Marianne Cintins
*Assistant Examiner*—Helen Pratt
*Attorney, Agent, or Firm*—Karen F. Clark; Ronald L. Hemingway; Richard C. Witte

[57] ABSTRACT

Synthetic cheese products which are reduced in calories and animal fat are produced by combining protein derived from dry-powdered bland-flavored milk protein, vegetable protein, aged or non-aged low-fat or full-fat cheese, or mixtures thereof; water; cheese flavors; an emulsifying salt; an acidulant; adjuvant materials, if desired; and a fatty substance which is non-digestible, partially digestible, or lower in net caloric efficiency than butterfat, animal fat, or vegetable fat.

32 Claims, No Drawings

SIMULATED CHEESE PRODUCTS WITH REDUCED ANIMAL FAT AND CALORIES

This is a continuation of application Ser. No. 366,566, filed on June 14, 1989, now abandoned.

FIELD OF THE INVENTION

This invention relates to simulated cheese products that exhibit a reduction in calories and animal fat.

BACKGROUND OF THE INVENTION

There is an ever-increasing interest among consumers in food products which contain less total fat, saturated fat, cholesterol, and calories. Such products are useful in controlling body weight and reducing the risk of heart and artery disease.

Traditional full-fat cheese products which contain inherent butterfat generally contain from about 15% to about 35% saturated fat, from about 50 mg to about 100 mg cholesterol per 100 g, and from about 300 to about 400 calories per 100 g. Because of this high fat and calorie content, there has long been a significant need for cheese products which have a substantially reduced fat and reduced calorie content and yet which provide the gustatory and physical properties of conventional butterfat-containing full-fat cheese products.

For many years, synthetic cheese products have been made wherein the butterfat traditionally present in full-fat cheese was replaced with an alternative, less expensive, animal or vegetable fat. This practice became widespread in the early 1940's when advances in processing technology surfaced in, for example, the areas of homogenization and fluid blending. In almost all cases, the synthetic cheeses are offered at lower cost, which was probably the most important single factor in the initial acceptance of synthetic dairy foods. Another beneficial aspect of synthetic cheese products is the fact that many such products can be produced with an almost unlimited shelf life. Recently, however, with the public's increased awareness of the dangers of cholesterol found in animal fats, synthetic cheese products wherein the butterfat is replaced with a vegetable fat have gained increased popularity. The term "animal fats" as used herein encompasses the fats derived from dairy, fish, or meat sources.

Synthetic cheeses are made utilizing as a protein source either aged or non-aged low-fat cheese, vegetable-derived protein such as soy or soy isolate, or commercially available dry-powdered protein derived from fresh, whole or skim milk, buttermilk, or cream, such as, for example, sodium calcium caseinate. A synthetic cheese utilizing skim milk cheese, a type of non-aged low-fat cheese, is described in U.S. Pat. No. 2,604,405 to Petersen, issued Jan. 6, 1980, incorporated herein by reference. Synthetic cheeses using proteinaceous materials derived from vegetable sources are described in U.S. Pat. No. 4,684,533 to Kratchovil (assigned to Kraft, Inc.), issued Aug. 4, 1987; U.S. Pat. No. 4,678,676 to Ishizuka et al. (assigned to Taiyo Yushi K.K.), issued July 7, 1987; and U.S. Pat. No. 3,806,606 to Seiden (assigned to The Procter & Gamble Company), issued Apr. 23, 1974, all incorporated herein by reference. Finally, synthetic cheeses made from a commercially available dry-powdered protein derived from fresh, whole or skim milk, buttermilk, or cream, preferred for use in the present invention, are described in the following patents, all incorporated by reference herein: Canadian Patent 952,761 to Roe (assigned to PVO International, Inc.), issued Aug. 13, 1974; U.S. Pat. No. 3,941,891 to Kasik et al. (assigned to Beatrice Foods), issued Mar. 2, 1976; U.S. Pat. No. 4,197,322 to Middleton (assigned to Universal Foods), issued Apr. 8, 1980; and U.S. Pat. No. 4,397,926 to Galal et al. (assigned to Borden), issued Aug. 9, 1983.

The edible vegetable triglycerides conventionally used in synthetic cheese products to simulate the butterfat inherently contained in traditional full-fat cheese are more healthy for human consumption than butterfat or animal fat, particularly because these fats are higher in unsaturates and contain no cholesterol. However, there is no reduction in calories because, gram-for-gram, these two types of fats are of equivalent caloric content.

The present invention provides a simulated cheese product which retains the desirable reduction in animal fat and cholesterol yet adds the additional benefit of a reduction in calories. The fatty properties inherently supplied in traditional full-fat cheese by butterfat and, conventionally, in synthetic cheese by animal or, preferably, vegetable, fat will be supplied by a fatty substance which contains low-calorie fatty materials which are non-digestible, partially digestible, or are lower in net caloric efficiency as compared to regular fat. These simulated cheese products are equivalent to traditional full-fat cheese and conventional synthetic cheese regarding protein, vitamin, and mineral content and have flavor, body, and texture resembling that of traditional full-fat cheese. In addition, the simulated cheese products of the present invention exhibit a caloric reduction not present in traditional butterfat-containing full-fat cheese or in conventional synthetic cheese products wherein the natural inherent butterfat is replaced with digestible animal and/or vegetable oil and/or shortening.

It is therefore an object of this invention to create simulated cheese products that yield as much as a 40% reduction in calories, a 50% reduction in animal fat and saturated fat, and a 90% reduction in cholesterol as compared to traditional full-fat cheese.

It is another object of this invention to obtain the reduction in animal fat and cholesterol exhibited by synthetic cheese products wherein the butterfat has been replaced by vegetable fat, and at the same time obtain a reduction in calories.

It is an additional object of this invention to produce low-calorie simulated cheese products which are nutritionally equivalent to full-fat cheese in regard to protein, vitamin and mineral content and which exhibit flavor, body, and texture resembling that of full-fat cheese.

It is a further object of this invention to produce a variety of low-calorie simulated cheese products including, but not limited to Cheddar, American, Colby, Emmentaler, Limberger, Guyere, Camembert, Gouda, Edam, Cream, Tilsit, Trappist, Fontina, Provolone, Kaschkavall, Samso, Danbo, Maribo, and Fynbo.

These and other objects of the invention will become clear by the disclosure herein.

All percentages and ratios are by weight unless otherwise indicated.

SUMMARY OF THE INVENTION

Low-calorie simulated cheese products are disclosed herein which exhibit as much as a 40% reduction in calories, a 50% reduction in animal fat and saturated fat, and a 90% reduction in cholesterol as compared to traditional full-fat cheese products.

These products contain about the same level of protein as conventional synthetic cheese products, but about 30% to about 100% of the regular amount of vegetable or animal fat (that replaces the butterfat inherent in traditional full-fat cheese) has been replaced with low-calorie fatty materials. Said low-calorie simulated cheese products comprise from about 5% to about 50% of protein, selected from the group consisting of commercially available dry-powdered protein derived from fresh, whole or skimmed milk, buttermilk, or cream; aged or non-aged low-fat cheese; aged or non-aged full-fat cheese; vegetable protein derived from vegetable proteinaceous materials; or mixtures thereof; from about 4% to about 35% of a non-digestible or partially digestible fatty substance which consists essentially of from about 30% to about 100% of low-calorie fatty materials; from about 30% to about 80% water; from about 0.2% to about 4% conventional cheese flavors; from about 0.2% to about 3% of an emulsifying salt; and from about 0.05% to about 2% of an acidulant.

Of the protein which comprises from about 5% to about 50% of the simulated cheese products of the present invention, at least about 70% of the protein is obtained from a protein source selected from the group consisting of dry-powdered milk protein, vegetable protein, full-fat cheese, or mixtures thereof, and less than about 30% of the protein is obtained from low-fat cheese.

It may be desirable to include aged or non-aged full-fat cheese as a portion of the protein source for the simulated cheese products of the present invention. Aged or non-aged full-fat cheese will impart more cheese flavor, texture, and lubricity, but will add more fat, calories, and cholesterol. Therefore, as the amount of aged or non-aged full-fat cheese included as the protein source increases, the reduction in fat, calories, and cholesterol in the synthetic cheese product decreases. If it is desired to incorporate aged or non-aged full-fat cheese as a portion of the protein source, it is preferable that no more than about 70% of the protein source consists of the aged or non-aged full-fat cheese; the remainder should then consist of any of the various other protein sources described herein.

The low-calorie simulated cheese products of the present invention may also comprise up to about 10% of non-fatty adjuvant materials selected from the group consisting of vitamins or minerals; flavorings or extracts; chips or chunks of meat, fruit, or vegetables; cream, milk, whey; sweetening agents; binding agents; or various other added adjuvant materials as will be defined herein.

By the term "low-calorie simulated cheese products" is meant all forms of cheese-flavored products which contain protein obtained from a protein source that is derived either from aged or non-aged low-fat cheese; aged or non-aged full-fat cheese; vegetable protein derived from vegetable proteinaceous material, or preferably, bland-flavored dry-powdered milk protein; and which are reduced in calories, animal fat, saturated fat, and cholesterol. Although it is preferable to utilize dry-powdered milk protein which is derived from fresh, whole or skimmed milk, buttermilk, or cream as the protein source, aged or non-aged low-fat cheese, aged or non-aged full-fat cheese, and vegetable proteins derived from vegetable material are certainly suitable, as is a mixture of any of these protein sources. The word "simulated" as used herein indicates that all or part of the vegetable or animal fat present in conventional processed cheese products is replaced with low-calorie fatty materials.

By "fatty substance" as used herein is meant a material which replaces all or part of the vegetable or animal fat in conventional processed cheese products. Said fatty substance consists essentially of from 30% to about 100% of low-calorie fatty materials, with the balance being added animal or vegetable fat.

By "low-calorie fatty materials" as used herein is meant edible materials which are non-digestible, partially digestible or have reduced calorie efficiency and which have physical properties similar to triglyceride fats and therefore can replace the triglyceride fats present in conventional synthetic cheese products. These materials provide the benefits (such as consistency, texture, and/or flavor) of butterfat present in traditional full-fat cheese and of vegetable, meat, or fish source fats present in synthetic cheese, yet are lower in calories because they are non-digestible, only partially digestible, or are lower in net caloric efficiency as compared to animal fat.

By "non-digestible" as used herein is meant that substantially all the material is not digested or absorbed by the body. Said material passes through the digestive system substantially the same as when it was ingested.

The term "partially digestible" means that at least about 30% of the material is not digested or absorbed by the body.

The term "net caloric efficiency" of a material as used herein means its net contribution of useful energy to the maintenance or growth of the body, taking into account its metabolism, utilization, storage, and excretion by the body. For example, triglycerides containing $C_8$ and $C_{10}$ fatty acids are known to have lower "net caloric efficiency" than triglycerides of $C_{12}$ to $C_{20}$ fatty acids.

By "anti-anal leakage (AAL) agent" as used herein is meant edible materials which prevent leakage of non-digested liquid low-calorie fatty materials through the anal sphincter. Such AAL agents include fatty acids having a melting point of ca. 37° C. (98.6° F.) or higher, and partially- or fully-digestible natural or processed fats that yield such fatty acids in the gut are known to be effective AAL agents (see U.S. Pat. No. 4,005,195 to Jandacek, issued Jan. 25, 1977.)

By "liquid/solid stability" as used herein is meant that the liquid portion of the material does not readily separate from the solid portion at body temperature, i.e., the material appears to be a solid even though up to about 95% of it is liquid. Liquid/solid stability is measured by centrifuging a sample of the material at 60,000 rpm for one hour at 37.8° C. (100° F.). Liquid/solid stability is defined as: 100% minus the percentage of the material that separated as a liquid after centrifuging.

By "adjuvant materials" as used herein is meant non-fatty materials selected from the group consisting of vitamins or minerals; flavors or extracts; chips or chunks of meat, fruit, or vegetables; sodium or potassium nitrate, nitrite, phosphate, ascorbate, or erythrobate; vinegar, citric acid, and malic acid; glucono delta lactone, salt, sucrose, dextrose, lactose, and corn syrups or corn syrup solids; seasonings and flavor enhancers; cereal, starch, vegetable flour, soy flour, soy protein; cream, non-fat milk, calcium-reduced non-fat milk, whey, egg albumin; dietary fiber; sweetening agents;

edible gums, pectins, and hydrocolloids; emulsifiers; and mixtures thereof.

The term "commercially available dry-powdered milk protein" as used herein refers to any of variety of bland-flavored, dry-powdered proteins derived from fresh, whole or skimmed milk, buttermilk or cream. Said protein powder may be chosen from the group consisting of sodium caseinate, calcium caseinate, sodium calcium caseinate, acid casein, rennet casein, and mixtures thereof.

The term "vegetable protein" as used herein includes any proteinaceous material derived from a vegetable protein source, including, but not limited to, soybean protein or soybean protein isolates.

The term "aged or or non-aged full-fat milk cheese" includes those cheeses that are produced utilizing full-fat milk as the starting source. The main ingredient in both aged and non-aged full-fat cheese is the curd which is made by the souring of full-fat milk, followed by the stirring of said soured milk to break up the coagulum which was formed during souring. The resulting mixture is next heated to free the whey to provide fresh curd. This curd may be subjected to aging, or ripening, to develop the characteristic flavors of certain various cheeses. "Aged full-fat cheese," then, is that curd made from full-fat milk which has been subjected to the ripening process. "Non-aged full-fat cheese" is that curd made from full-fat milk which has not been ripened. Aged full-fat cheeses include, but are not limited to, Cheddar, Colby, American, Blue Cheese, Camembert, Limberger, or Swiss. Non-aged full-fat cheeses include, but are not limited to, full-fat cottage cheese, Neufchatel cheese and cream cheese.

The term "aged or non-aged low-fat cheese" includes those cheeses that are produced utilizing low-fat milk as the starting source to make the curd as described above. "Aged low-fat cheese" has been subjected to a ripening process and includes, but is not limited to, Mozarella, Parmesan and Romano cheese. "Non-aged low-fat cheese" has not been subjected to a ripening process and includes, but is not limited to, low-fat cottage cheese, low-fat cream cheese and "skim-milk cheese". "Skim-milk cheese" is curd made from skim milk and is not available to consumers, but is sold to cheese manufacturers for use in various cheese products.

Among the preferred low-calorie fatty materials for incorporation into the simulated cheese products of the invention herein are polyol fatty acid polyesters. The polyol of the polyester is preferably selected from the group consisting of sugars and sugar alcohols containing from 4 to 8 hydroxyl groups, and of polyglycerols containing from 5 to 15 glycerol moieties. Preferably, at least 4 of the hydroxyl groups of the sugars and sugar alcohols and at least 85% of the hydroxyl groups of the polyglycerols are esterified with fatty acids. When the polyol is a sugar, sugar alcohol, or polyglycerol, the fatty acid ester groups preferably have saturated or unsaturated alkyl groups consisting essentially of from about 2 to about 24, preferably about 8 to about 24, most preferably about 14 to about 18, carbon atoms. Tailored triglycerides are also among the preferred low-calorie fatty materials for use herein and are esterified with long chain and medium chain fatty acids. The fatty acid composition of the tailored triglycerides is from about 15% to about 70% by weight $C_6$ and $C_{10}$ saturated fatty acids and from about 10% to about 70% by weight $C_{17}$ to $C_{26}$ saturated fatty acids.

The more preferred polyol fatty acid polyester low-calorie fatty materials for use in the present invention are those sugar, sugar alcohol, and polyglycerol fatty acid polyesters which (a) are solid or semi-solid at room temperature; (b) are liquid at body temperature and to which is added sufficient anti-anal leakage agent to prevent leakage of said liquid polyester through the anal sphincter; and/or (c) have, at 37.8° C. (100° F.): (1) a viscosity of at least about 0.5 poise, preferably at least 2.5 poise, more preferably at least about 5 poise, more preferably at least about 10 poise, and most preferably at least about 15 poise, at a shear rate of 10 seconds$^{-1}$ after 10 minutes of steady shear and (2) a liquid/solid stability of at least 30%, preferably of at least about 50%, more preferably of at least about 70%, and most preferably of at least about 90%. The most preferred fatty acid polyol polyesters are those wherein the polyol is sucrose.

The preferred protein source for use in the low-calorie simulated cheese products of the present invention is commercially available bland-flavored, dry-powdered protein derived from fresh, whole or skimmed milk, buttermilk, or cream, including, but not limited to, sodium caseinate, calcium caseinate, sodium calcium caseinate, acid casein, rennet casein, and mixtures thereof.

DETAILED DESCRIPTION OF THE INVENTION

The present invention comprises low-calorie simulated cheese products which exhibit as much as a 40% reduction in calories, a 50% reduction in animal fat and saturated fat, and a 90% reduction in cholesterol as compared to traditional full-fat cheese products.

These products contain about the same level of protein as conventional synthetic cheese, but have about 30% to about 100% of the regular amount of animal or vegetable fat present in traditional full-fat or conventional synthetic cheese replaced with low-calorie fatty materials. Said low-calorie simulated cheese products comprise from about 5% to about 50% of protein which is obtained from a protein source selected from the group consisting of bland-flavored, commercially available, dry-powdered protein derived from fresh, whole or skimmed milk, buttermilk, or cream; aged or non-aged low-fat cheese, aged or non-aged full-fat cheese; vegetable protein derived from vegetable proteinaceous material; or mixtures thereof; from about 4% to about 35%, preferably from about 30% to about 35%, of a non-digestible or partially digestible fatty substance which consists essentially of from about 30% to about 100% of low-calorie fatty materials; from about 30% to about 80% water; from about 0.2% to about 4% conventional cheese flavors; from about 0.2% to about 3% of an emulsifying salt; and from about 0.05% to about 2% of an acidulant.

Of the protein which comprises from about 5% to about 50% of the composition of the simulated cheese product, at least about 70% of the protein is obtained from a protein source selected from the group consisting of dry-powdered milk protein, vegetable protein, full-fat cheese, or mixtures thereof, and less than 30% of the protein is obtained from low-fat cheese.

In order to add additional cheese flavor, lubricity, and texture, it may be desirable that a portion of the protein source may be aged or non-aged full-fat cheese. However, along with the added cheese flavor and consistency, full-fat cheese contributes inherent butterfat, and, therefore, additional fat, calories, and cholesterol are imparted to the synthetic cheese product. For this reason, it is preferable that no more than 70% of the protein source be selected from full-fat cheese.

If desired, the product can also contain up to about 10% of non-fatty materials selected from the group consisting of vitamins and minerals; flavors or extracts; chips or chunks of meat, fruit, or vegetables; cream, whey, milk; sweetening agents; binding agents; or various other added adjuvant materials as defined herein.

PROTEIN SOURCES SUITABLE FOR USE IN LOW-CALORIE SIMULATED CHEESE PRODUCTS

The low-calorie simulated cheese products of the present invention may utilize as their proteinaceous component any source compatible with the low-calorie fatty materials described hereinafter. Aged or non-aged low-fat cheese, aged or non-aged full-fat cheese, vegetable-derived protein such as soy isolates, and any mixture thereof, are suitable, but the preferred proteinaceous materials for use in the simulated cheese products described herein are commercially available dry-powdered, bland-flavored milk proteins. These proteins are derived from fresh, whole or skimmed milk, buttermilk, or cream. Most preferable among these are sodium caseinate, calcium caseinate, sodium calcium caseinate, acid casein, rennet casein, and any mixture thereof. Although it is preferable to utilize dry powdered milk proteins as the protein source of the simulated cheese product herein, a mixture of any of the various protein sources mentioned above is suitable for use.

It is also possible to utilize aged or non-aged full-fat cheese as part of the protein source. While aged or non-aged full-fat cheese adds more conventional cheese flavor, lubricity, and texture, it also adds inherent butterfat, cholesterol, and calories Aged or non-aged low-fat cheese, on the other hand, has substantially less butterfat, cholesterol, and calories, but does not contribute as much cheese flavor and consistency as aged or non-aged full-fat cheese.

In addition, there are numerous protein-based fat-like materials or fat substitutes which could be used as all or part of the protein source. These materials would add protein to the composition and would also impart more fat-like lubricity and texture to the simulated cheese, without adding the cholesterol or calories associated with conventional fats. These materials include, but are not limited to, the materials described in the following U.S. Patents, incorporated by reference herein: U.S. Pat. No. 4,734,287, issued Mar. 29, 1988 and U.S. Pat. No. 4,744,521, issued May 17, 1988, both to Singer et al. and both assigned to John LaBatt, Ltd.; and U.S. Pat. No. 4,305,970 to Moran et al. (assigned to Lever Bros.), issued Dec. 15, 1981.

FATTY SUBSTANCES FOR USE IN LOW-CALORIE SIMULATED CHEESE PRODUCTS

The low-calorie simulated cheese products of the present invention have about 30% to about 100% of the regular amount of fat conventionally present in traditional full-fat cheese products or conventional synthetic cheese products replaced with a fatty substance containing low-calorie fatty materials. The fatty substance as used herein consists essentially of from about 30% to about 100% of low-calorie fatty materials, with the balance being added conventional vegetable or animal fat or butterfat inherent within aged or non-aged full-fat cheese.

Smaller reductions in saturated fat and calories are achieved if the fatty substance used in the low-calorie simulated cheese products of the present invention contains, instead of non-digestible low-calorie fatty materials, added vegetable or animal fat or low-calorie fatty materials which are partially digestible or only somewhat lower in net caloric efficiency than butterfat. If vegetable or animal fats are used in the fatty substance, it is preferable to use vegetable or animal fats which are solid or semi-solid at room temperature like the inherent butterfat in aged or non-aged full-fat cheese that synthetic cheese products seek to replace. For optimum flavor in the low-calorie simulated cheese products, the low-calorie fatty materials and the vegetable or animal fat, if used, should be freshly deodorized, a common practice in edible vegetable shortening and oil production, just prior to incorporation into the simulated cheese product composition. It is also preferable to use a vegetable fat or an animal fat, e.g., deodorized fish oil, which is high in mono- and/or polyunsaturated fatty acids for added health benefits.

The low-calorie fatty materials to be utilized in the fatty substance are described herein immediately below:

LOW-CALORIE FATTY MATERIALS

The low-calorie fatty materials used in the fatty substance described in this invention are edible materials which can replace the triglyceride fat present in conventional synthetic cheese products. These materials provide the benefits of butterfat inherently contained in full-fat cheeses, such as consistency, texture, body, and flavor, yet do not add as many calories because they are non-digestible, partially digestible, or are lower in net caloric efficiency as compared to both butterfat present in full-fat cheese and animal or vegetable fat in conventional synthetic cheese products.

Many classes of low-calorie fatty materials are suitable for use in the present invention. Examples of such materials are: fatty alcohol esters of polycarboxylic acids (U.S. Pat. No. 4,508,746 of Hamm, assigned to CPC International, Inc., issued Apr. 2, 1985); fatty polyesters of polyglycerol (U.S. Pat. No. 3,932,532 of Hunter et al., assigned to ICI United States, Inc., issued Jan. 13, 1976) (use in cheese products disclosed in German Patent 207,070, issued Feb. 15, 1984)); fatty ethers and ether-esters of polyols containing the neopentyl moiety (U.S. Pat. No. 2,962,419 of Minich, issued Nov. 29, 1960); fatty alcohol diesters of dicarboxylic acids such as malonic and succinic acid (U.S. Pat. No. 4,582,927 of Fulcher, assigned to Frito-Lay, Inc., issued Apr. 15, 1986); triglyceride esters of alpha branched chain-alkyl carboxylic acids (U.S. Pat. No. 3,579,548 of Whyte, assigned to The Procter & Gamble Co., issued May 18, 1971); and sugar and sugar alcohol fatty acid polyesters (U.S. Pat. Nos. 3,600,186 of Mattson and Volpenhein, assigned to The Procter & Gamble Company, issued Aug. 17, 1971; U.S. Pat. No. 4,005,195 to Jandacek, issued Jan. 25, 1977; U.S. Pat. No. 4,005,196 to Jandacek et al., issued Jan. 25, 1977; U.S. Pat. No. 4,034,083 to Mattson, issued July 5, 1977; and U.S. Pat. No. 4,241,054 to Volpenhein et al., issued Dec. 23, 1980; and European Patent applications of Bernhardt, U.S. Pat. No. 0,236,288, published Sept. 9, 1987 and U.S. Pat. No. 0,233,856, published Aug. 26, 1987) all assigned to The Procter & Gamble Company, and all incorporated herein by reference. The fatty moieties of these materials typically contain from about 8 to about 24 carbon atoms, preferably from about 14 to about 18 carbon atoms.

Numerous protein-based fat substitutes are available and could be used as low-calorie fatty materials. These materials would provide the benefits of low-calorie fatty materials but would additionally serve to enhance the protein content of the composition. These materials include, but are not limited to, the materials described in the following U.S. Patents, incorporated by reference herein: U.S. Pat. 4,734,287, issued Mar. 29, 1988 and U.S. Pat. No. 4,744,521, issued May 17, 1988, both to Singer et al. and both assigned to John LaBatt, Ltd. and U.S. Pat. No. 4,305,970 to Moran et al. (assigned to Lever Bros.), issued Dec. 15, 1981.

However, for reasons of cost efficiency, consumer acceptability, and assurance of inherent safety, the preferred low-calorie fatty materials for use in the low-calorie simulated cheese products of the present invention are certain polyol fatty acid polyesters, namely sugar, sugar alcohol, and polyglycerol fatty acid polyesters, and mixtures thereof. The polyol fatty acid polyester compounds are prepared by reacting a mono-saccharide, disaccharide, sugar alcohol, or polyglycerol with such fatty acids as will be disclosed herein. Tailored triglycerides having reduced net caloric efficiency are also preferred for use as low-calorie fatty materials herein.

A. Polyol Fatty Acid Polyesters

Sugar and sugar alcohol fatty acid polyesters are among the preferred polyol fatty acid polyesters for use as the low-calorie fatty materials in the present invention and comprise fatty acids and sugars or sugar alcohols as polyols. The term "sugar" is used herein in its conventional sense as generic to mono- and disaccharides. The term "sugar alcohol" is likewise used in its conventional sense as generic to the reduction product of sugars wherein the aldehyde or ketone group has been reduced to an alcohol. The sugars and sugar alcohols preferred for use herein contain from about 4 to about 8 hydroxyl groups.

Examples of suitable monosaccharides are those containing 4 hydroxyl groups such as xylose, arabinose, and ribose; the sugar alcohol derived from xylose, i.e., xylitol, is also suitable. The monosaccharide erythrose is not suitable for the practice of this invention since it only contains 3 hydroxyl groups; however, the sugar alcohol derived from erythrose, i.e. erythritol, contains 4 hydroxyl groups and is thus suitable. Among 5 hydroxyl-containing monosaccharides that are suitable for use herein are glucose, mannose, galactose, fructose, and sorbose. A sugar alcohol derived from sucrose, glucose, or sorbose, e.g., sorbitol, contains 6 hydroxyl groups and is also suitable as the alcohol moiety of the fatty acid ester compounds. Examples of suitable disaccharides are maltose, lactose, and sucrose, all of which contain eight hydroxyl groups.

The sugar or sugar alcohol fatty acid polyesters useful in this invention must contain at least 4 fatty acid ester groups. Sugar or sugar alcohol fatty acid polyester compounds that contain 3 or less fatty acid ester groups are digested in, and the products of digestion are absorbed from, the intestinal tract much in the manner as ordinary triglyceride fats, whereas the sugar or sugar alcohol fatty acid polyester compounds that contain 4 or more fatty acid ester groups are substantially non-digestible and consequently non-absorbable by the human body. It is not necessary that all of the hydroxyl groups of the sugar or sugar alcohol be esterified with fatty acid, but it is preferable that the polyol contain no more than 3 unesterified hydroxyl groups, and more preferable that it contain no more than 2 unesterified hydroxyl groups. Most preferably, substantially all of the hydroxyl groups of the sugar or sugar alcohol are esterified with fatty acid, i.e., the compound is substantially completely esterified. The fatty acids esterified to the sugar or sugar alcohol molecule can be the same or mixed.

Preferred sugars or sugar alcohols for preparing the polyesters for use in the present invention are selected from the group consisting of erythritol, xylitol, sorbitol, glucose, and sucrose. Sucrose is especially preferred.

Polyglycerol fatty acid polyesters are also among the preferred low-calorie fatty materials for use in the present invention and comprise fatty acids and polyglycerol as a polyol. The term "polyglycerol" is used herein to describe mixtures of ethers of glycerol with itself, ranging from 2 to 30 glycerol units per molecule. Polyglycerol is prepared by polymerization of glycerol in the presence of either acid or base with the removal of water during reaction. For example, the synthesis described in U.S. Pat. No. 3,968,169 of Seiden and Martin (assigned to The Procter & Gamble Company), issued July 6, 1976, is suitable and is incorporated by reference herein. Polyglycerol can be fractionated by methods known in the art, such as molecular distillation, to give specific polymer ranges. The polyglycerol ester compounds are prepared by reacting a polyglycerol with such fatty acids as will be disclosed herein. Preferred polyglycerols contain predominantly about 5 to about 15, and more preferably about 6 to about 10, etherified glycerol units.

A characterizing feature of the polyglycerol fatty acid polyesters useful in this invention is that they predominantly contain at least 4, and preferably at least 5, etherified glycerol units, and have at least 75%, preferably at least 85%, of their hydroxyl groups esterified with fatty acids. Polyglycerol fatty acid polyester compounds that contain 3 or less etherified glycerol units are digested, absorbed, and metabolized much in the same manner as ordinary triglyceride fats, but polyglycerol fatty acid polyester compounds that contain 4 or more etherified glycerol units are digested, absorbed, and metabolized to a lesser extent, or not at all, and thus have the desired low-calorie properties for use in this invention.

The polyol starting material, e.g., the sugar, sugar alcohol, or polyglycerol., must have at least four hydroxyl groups and must be esterified on at least four of the hydroxyl groups with a fatty acid containing from about 2 to about 24, preferably from about 8 to about 24, and most preferably from about 14 to about 18, carbon atoms. Examples of such fatty acids include caprylic, capric, lauric, myristic, myristoleic, palmitic, palmitoleic, stearic, oleic, ricinoleic, linoleic, linolenic, eleostearic, arachidic, arachidonic, behenic, and erucic acid. The fatty acids can be derived from naturally occurring or synthetic fatty acids; they can be saturated or unsaturated, including positional or geometrical isomers.

Sucrose fatty acid polyesters are highly preferred polyol polyesters for use as the low-calorie fatty materials in the present invention. The sucrose fatty acid polyesters preferably have the majority of their hydroxyl groups esterified with fatty acids. Production of sucrose fatty acid polyesters usually results in mixtures of sucrose esters having different degrees of esterification.

Preferably at least about 85%, and most preferably at least about 95%, of the sucrose fatty acid esters in said mixtures are selected from the group consisting of octa-esters, heptaesters and hexaesters, and mixtures thereof. Preferably, no more than about 35% of the esters are hexaesters or heptaesters, and at least about 60%, preferably at least about 70%, of the esters are octaesters. It is also most preferred that the polyesters have a total content of penta- and lower esters of not more than about 3%.

The sucrose fatty acid esters are preferably esterified with particular kinds of fatty acids. Preferably, at least about 80%, and most preferably at least about 90%, of the fatty acids are selected from the group consisting of mixtures of $C_{16:0}$ (palmitic), $C_{18:0}$ (stearic), $C_{18:1}$ (oleic), $C_{18:2}$ (linoleic), $C_{22:0}$ (behenic) and $C_{22:1}$ (erucic) fatty acids, their geometric and positional isomers, and mixtures thereof. It is also most preferred that at least about 80% of the fatty acids are selected from the group consisting of mixtures of $C_{16}$ to $C_{18}$ fatty acids.

The polyol fatty acid polyesters used in the compositions of the present invention can be liquid, solid, semi-solid, or mixtures thereof. It is preferable, however, to use a fatty substance in the solid or semi-solid form, rather than the liquid form, because higher levels can be incorporated without adversely affecting the consistency or taste of the low-calorie synthetic cheese products. This is because the butterfat inherent in a full-fat cheese which is being replaced with the fatty substance is a solid or semi-solid at room temperature. Preferred fatty substances are those which contain a liquid polyol polyester and are described hereinbelow.

The solid polyol fatty acid polyesters are defined herein as those which are solids at body temperature, i.e., have a melting point of above about 37° C. (98.6° F.). Non-limiting examples of specific solid polyol fatty acid esters include sucrose octastearate, sucrose octapalmitate, sucrose heptastearate, xylitol pentastearate, galactose pentapalmitate, and like, saturated polyol polyesters having at least four hydroxyl groups esterified with $C_{10}$–$C_{22}$ saturated fatty acids.

The liquid polyol fatty acid polyesters are defined herein as those which are liquids at body temperature, i.e., have a melting point of about 37° C. (98.6°) or below. In general, liquid esters are those which are made from predominantly unsaturated fatty acids, whereas solid esters are made from predominantly saturated fatty acids. In order to provide liquid polyol fatty acid polyesters, generally at least about half of the fatty acids incorporated into an ester molecule must be unsaturated. Oleic and linoleic acids, and mixtures thereof, are especially preferred. The following are non-limiting examples of specific liquid polyol fatty acid polyesters containing at least four fatty acid ester groups suitable for use in the present invention: glucose tetraoleate, the glucose tetraesters of soybean oil fatty acids, the mannose tetraesters of mixed soybean oil fatty acids, the galactose tetraesters of oleic acid, the arabinose tetraesters of linoleic acid, xylose tetralinoleate, galactose pentaoleate, sorbitol tetraoleate, the sorbitol hexaesters of soybean oil fatty acids, xylitol pentaoleate, sucrose tetraoleate, sucrose pentaoleate, sucrose hexaoleate, sucrose heptaoleate, sucrose octaoleate, and mixtures thereof.

It is known that liquid polyol fatty acid polyesters can cause an undesired anal leakage effect. U.S. Pat. No. 4,005,195 of Jandacek and U.S. Pat. No. 4,005,196 of Jandacek et al., both incorporated by reference herein, disclose a means of avoiding this problem by the addition of anti-anal leakage agents to the liquid polyesters.

Therefore, a preferred embodiment of the present invention is a low-calorie simulated cheese product wherein the low-calorie fatty materials contain a liquid polyol polyester and additionally comprise sufficient anti-anal leakage agent to prevent leakage of the polyol polyester through the anal sphincter. The simulated cheese product comprises from about 3% to about 50% anti-anal leakage agent by weight of the polyol polyester, preferably at least about 5%, more preferably from about 5% to about 30%. A preferred anti-anal leakage agent is a solid polyol fatty acid polyester.

An additional type of AAL agent described by Jandacek in U.S. Pat. No. 4,005,195 is fatty acids having a melting point of ca. 37° C., or higher, and ingestible, digestible sources of such fatty acids. These fatty acid AAL agents include, for example, the $C_{12}$–$C_{24}$ saturated fatty acids, and ingestible, digestible sources thereof. It is hypothesized that this type of AAL agent functions by the formation of calcium and magnesium fatty acid soaps in the gut which apparently interact with the liquid polyol polyesters and impart a "stiffening" effect thereto. Once "stiffened", or partly solidified, in the gut, the liquid polyol polyesters do not leak through the anal sphincter. The AAL effect of this type of AAL agent may be enhanced by the fortification with calcium and/or magnesium of the food which contains the low-calorie fatty material or a food with which the low-calorie fatty material-containing food is consumed. When this type of AAL agent is employed, it is necessary that the simulated cheese product comprises from about 5% to about 50%, preferably from about 15% to about 30%, of said AAL agent by weight of the liquid polyol polyester.

Another highly preferred kind of AAL agent for use with polyol polyesters which by themselves are liquid at body temperature, i.e., have a melting point below 37° C. (98.6° F.), comprises edible, non-digestible solid sucrose fatty acid polyesters in which the fatty acid groups consist essentially of short chain fatty acid radicals containing from about 2 to about 10 carbon atoms and long chain fatty acid radicals containing from about 20 to 24 carbon atoms, the molar ratio of short chains to long chains being from about 4:4 to about 3:5 and the degree of esterification being from about 7 to about 8. These compounds can be made by a variety of methods known to those skilled in the art such as those methods cited hereinabove. When using the methyl ester route for preparing these compounds, the octaester of the short chain fatty acid is prepared first, then this product is partially interesterified with the methyl ester of the long chain fatty acid in order to obtain the sucrose ester of the mixed short chain/long chain fatty acids. These compounds are solid at temperatures below about 40° C. (104° F.). They have the ability to trap large amounts of liquid oil within their crystal structure, and, as a consequence, can be blended in relatively small amounts (on the order of about 10% to about 20%) with liquid oils to convert the oils to compositions which remain solid or semi-solid at temperatures below about 40° C. (104° F.).

The Solid Fat Content value (SFC) provides a reasonable approximation of the percent by weight solids of a particular fatty material at a given temperature. A minimum SFC in the mixtures of liquid and solid polyol fatty acid polyesters is preferred for anti-anal leakage control. Mixed solid/liquid fatty acid polyol polyesters for use herein should have a SFC of at least about 3% at 100° F. (37.8° C.) and preferably at least about 5%. The polyesters should have a SFC of about 3% to about 20%, preferably about 5% to about 20%, and most preferably of about 5% to about 15%. The method of measuring the SFC in polyol fatty acid polyesters is set forth in the Analytical Methods section below.

As defined herein, the particular liquid/solid stability of a fatty material indicates whether the liquid potion of the material does not readily separate from the solid portion at body temperature. For example, a fatty material exhibiting an excellent liquid/solid stability would appear to be a solid even though up to about 95% of it is liquid. The polyol fatty acid polyesters of the present invention exhibit a liquid/solid stability of at least about 30%, preferably at least about 50%, more preferably at least about 70%, and most preferably at least about 90%.

These liquid/solid stability and solid fat content properties are preferred for either a physical mixture of different solid and liquid polyol fatty acid polyesters, or a single polyol polyester of mixed fatty acids that is partially liquid and partially solid at 100° F. (37.8° C.).

Also preferred for use in the present invention are polyol fatty acid polyesters, particularly sugar or sugar alcohol polyesters or mixtures thereof, that have relatively high liquid/solid stability at relatively low solids levels. These polyol polyesters are preferred because the low solids levels give them a less waxy taste. In particular, the preferred polyesters have the following properties at 100° F. (37.8° C.): (a) a liquid/solid stability of at least about 50%, preferably at least about 70%; and (b) a solid fat content (SFC) of not more than about 20%. The solid fat content is preferably between about 3% and about 20%, and more preferably between about 5% and about 15%.

"Viscosity", a well-known technological property, is a measure of the internal friction resisting the movement of each layer of fluid as it moves past an adjacent layer of fluid. Viscosity can be measured by use of an instrument such as a plate and cone viscometer (e.g., a Ferranti-Shirley viscometer, manufactured by Ferranti Electric, Inc., 87 Modular Ave., Commack, NY 11725). The basics of rheology are discussed in Idson, "Rheology: Fundamental Concepts", *Cosmetics and Toiletries*, Vol. 93, pp. 23-30 (July 1978), incorporated herein by reference.

To measure viscosity of a sample of the polyol fatty acid polyester materials for use in this invention, a plate and cone viscometer is used to record a rheogram, which is a plot of shear stress versus time at a fixed shear rate. Viscosity is calculated from the shear stress shown on the rheogram curve after so many minutes of steady shear. These measurements are described in more detail herein in the Analytical Methods section below.

It is preferred that these polyol polyesters have a viscosity of at least about 0.5 poise after 10 minutes of steady shear at a shear rate of 10 seconds$^{-1}$, preferably at least about 2.5 poise, more preferably at least about 5 poise, more preferably at least about 10 poise, and most preferably at least about 15 poise. The preferred upper limit of the viscosity of these polyesters is about 10,000 poise, more preferably about 1,000 poise, most preferably 800 poise, after 10 minutes of shear at a shear rate of 10 seconds$^{-1}$.

The polyol fatty acid polyesters suitable for use as the low-calorie fatty materials in the low-calorie simulated cheese products described herein can be prepared by a variety of methods known to those skilled in the art. These methods include, for example, transesterification of the polyol with methyl, ethyl or glycerol fatty acid esters using a variety of catalysts; acylation of the polyol with a fatty acid chloride; acylation of the polyol with a fatty acid anhydride; and acylation of the polyol with a fatty acid, per se. Polyol polyesters, their use as fat substitutes, and their preparation are described in detail in the following U.S. Patents, all assigned to The Procter & Gamble Company, and all incorporated by reference herein: U.S. Pat. No. 3,600,186 to Mattson and Volpenhein, issued Aug. 17, 1971; U.S. Pat. No. 4,034,083 to Mattson, issued July 5, 1977; U.S. Pat. No. 2,831,854 to Tucker and Martin, issued Apr. 22, 1958; U.S. Pat. No. 3,963,699 to Rizzi and Taylor, issued June 15, 1976; and U.S. Pat. No. 4,518,772 issued May 21, 1955, and U.S. Pat. No. 4,517,360 issued May 14, 1985, both to Volpenhein; and U.S. Pat. No. 3,968,169 to Seiden and Martin, issued July 6, 1976.

Analytical Methods for Measurements on Polyol Fatty Acid Polyesters

1. Rheology Measurements a. Sample Preparation

The polyol polyester is heated until it completely melts and is thoroughly mixed. Ten grams of the melted sample is weighed into a pre-heated 20 ml glass vial. The sample is then allowed to recrystallize at 37.8° C. (100° F.) for 24 hours. After the 24 hour time period has elapsed, the sample is taken to the viscometer and the viscosity is measured.

b. Ferranti-Shirley Viscometer Operation Procedure

A Ferranti-Shirley viscometer is used for the viscosity measurements of the polyol polyester. A cone is put into place, and the viscometer temperature is adjusted to 37.8° C. (100° F.). The chart recorder is calibrated to read shear stress at 10 seconds$^{-1}$, and the gap between the cone and plate is set. The cone speed is checked, and the cone and plate temperatures are equilibrated to 37.8° C. (100° F.). The panel controls are set. Sufficient sample is placed between the plate and the cone so that the gap is completely filled. The temperature is allowed to stabilize at 37.8° C. (100° F.) for about 30 seconds. The test is started by selecting the RPM for the 10 seconds$^{-1}$ shear rate and recording on the strip chart recorder. The shear stress is allowed to reach maximum value, and the shear stress after 10 minutes of steady shear at 10 seconds$^{-1}$ is noted from the rheogram. Viscosity (poise) equals shear stress (dynes/cm$^2$) divided by shear rate (10 seconds$^{-1}$).

2. Liquid/Solid Stability Measurement:

The polyol polyester sample is heated until it completely melts and is thoroughly mixed. The sample is then poured into Beckman #344062 4.4 ml. centrifuge tubes. The tubes are immediately transferred to a 37.8° C.±3° C. (100° F.+5° F.) constant temperature room and allowed to recrystallize undisturbed for 24 hours. The samples are then centrifuged (using a Beckman model L8 70M ultra centrifuge and a Beckman Model SW60 centrifuge head) at 60,000 rpm for one hour at 37.8° C. (100° F.) (the centrifuge and centrifuge head are previously equilibrated at 37.8° C. (100° F.)). The maximum force on the samples is 485,000 Gs. The minimum force on the sample is 254,000 Gs and is applied to the top of the test tube due to the fact that the top of the tube is closest to the axis of rotation in the centrifuge and is thereby subjected to less centrifugal field. (For more information, see the publication entitled "Instructions for Using the SW 60Ti Rotor," L5-TB-0021, published by the Spinco Division of Beckman Instruments, Palo Alto, CA, 94304, April, 1984, hereby incorporated by reference.) The liquid/solid stability is then calculated as follows:

Liquid/Solid Stability =

$$\frac{100 \times (\text{Total volume of sample} - \text{Volume of liquid})}{\text{Total volume of sample}}$$

3. Solid Fat Content

The method for determining Solid Fat Content (SFC) values of a fat by PMR is described in Madison and Hill, *J. Amer. Oil, Chem. Soc.*, Vol. 55 (1978), pp. 328-31, herein incorporated by reference. Measurement of SFC by PNMR is also described in A.O.C.S. Official Method Cd. 16-81, *Official Methods and Recommended Practices of the American Oil Chemists Society*, Third Edition, 1987, (herein incorporated by reference). Before determining SFC values, the sample is heated to a temperature of 60° C. (140° F.) for at least 0.5 hour or until the sample is completely melted. The melted sample is then tempered at a temperature of 0° C. (32° F.) for 15 minutes, 27° C. (80° F.) for 30 minutes, and 0° C. (32° F.) for 15 minutes. After tempering, the SFC values of the sample at temperatures of 10° C. (50° F.), 21° C. (70° F.), 27° C. (80° F.), 33° C. (92° F.), 37.8° C. (100° F.), and 41° C. (105° F.) are determined by pulsed magnetic resonance (PMR) after equilibrating for 30 minutes at each temperature.

B. Tailored Triglycerides

The tailored triglycerides suitable for use as the low-calorie fatty materials in the simulated cheese products described herein are low-calorie materials having reduced net caloric efficiency compared to typical $C_{12}$ to $C_{20}$ fatty acid triglycerides. The tailored triglycerides herein are esterified with mixtures of long chain and medium chain fatty acids. The fatty acid composition of the tailored triglycerides is from about 15% to about 70% by weight $C_6$ to $C_{10}$ saturated fatty acids, and from about 10% to about 70% by weight $C_{17}$ to $C_{26}$ saturated fatty acids.

In the following listing of fatty acid moieties, the common name of the fatty acid is given following its $C_{x:y}$ designation (wherein x is the number of carbon atoms, and y is the number of double bonds).

By "medium chain fatty acids," as used herein, is meant $C_{6:0}$ (caproic), $C_{8:0}$ (caprylic), or $C_{10:0}$ (capric) fatty acids, or mixtures thereof. The $C_7$ and $C_9$ saturated fatty acids are not commonly found, but they are not excluded from the possible medium chain fatty acids. The present medium chain fatty acids do not include lauric acid ($C_{12:0}$), sometimes referred to in the art as a medium chain fatty acid.

By "long chain fatty acids," as used herein, is meant $C_{17:0}$ (margaric), $C_{18:0}$ (stearic), $C_{19:0}$ (nonadecylic), $C_{20:0}$ (arachidic), $C_{21:0}$ (heneicosanoic), $C_{22:0}$ (behenic), $C_{23:0}$ (tricosanoic), $C_{24:0}$ (lignoceric), $C_{25:0}$ (pentacosanoic), or $C_{26:0}$ (cerotic) fatty acids, or mixtures thereof.

The tailored triglycerides with combinations of medium and long chain fatty acids will preferably contain not more than about 5% by weight $C_{6:0}$ fatty acid, and most preferably not more than about 0.5%. It is also preferred that these triglycerides contain not more than about 7% by weight saturated $C_{24}$ and $C_{26}$ fatty acids, and most preferably not more than about 1%.

The tailored triglycerides of the present invention can contain limited amounts of other fatty acids besides medium and long chain fatty acids without losing the benefits of the invention.

$C_{16:0}$ fatty acid (palmitic acid) is about 95% absorbed by the body, while the longer chain fatty acids are less absorbed. Therefore, it is preferred that the tailored triglycerides contain not more than about 10% by weight $C_{16:0}$ fatty acid.

$C_{18}$ unsaturated fatty acids are also highly absorbed by the body. The tailored triglycerides should contain not more than about 6% by weight fatty acids selected from the group consisting of $C_{18:1}$, $C_{18:2}$, $C_{18:3}$, and mixtures thereof, and most preferably not more than about 0.5%. Preferred tailored triglycerides also contain not more than about 3% fatty acids selected from the group consisting of $C_{12:0}$ (lauric) and $C_{14:0}$ (myristic), and mixtures thereof. Whereas the medium chain fatty acids ($C_6$ to $C_{10}$) are absorbed by the body via the portal vein, lauric and myristic are absorbed via the lymphatic system. Lauric and myristic also result in more fat deposition than medium chain fatty acids.

Fatty acids per se or naturally occurring fats and oils can serve as the source for the fatty acid component of the triglycerides of this invention. For example, rapeseed oil provides a good source for $C_{22:0}$ fatty acid. Odd chain length long chain saturated fatty acids can be found in certain marine oils. Medium chain fatty acids can be obtained from coconut, palm kernel, or babassu oils. They can also be obtained from the commercial medium chain triglycerides, such as the Captex 300 brand sold by Capital City Products, Dept. TR, P.O. Box 569, Columbus, Ohio 43216.

The tailored triglycerides of the present invention can be prepared by a wide variety of techniques such as: (a) random rearrangement of long chain triglycerides (e.g. tribehenin) and medium chain triglycerides; (b) esterification of glycerol with a blend of the corresponding fatty acids; and (c) transesterification of a blend of medium and long chain fatty acid methyl esters with glycerol.

Random rearrangement of triglycerides is well-known in the art, as is the esterification of glycerol with fatty acids. For discussions on these subjects, see Hamilton et al., *Fats and Oils: Chemistry and Technology*, pp. 93-96, Applied Science Publishers Ltd., London (1980), and Swern, *Bailey's Industrial Oil and Fat Products*, 3d ed., pp. 941-943 and 958-965 (1964), both disclosures incorporated by reference herein. Transesterification is also discussed generally in Bailey's at pp. 958-963.

CHEESE FLAVORS

Various cheese flavors generally used when producing conventional synthetic cheese products may be satisfactorily employed in the low-calorie simulated cheese of the present invention. Cheese flavors especially suitable are selected from the group consisting of enzyme-modified cheese flavors, natural cheese flavors, and flavors from aged or non-aged full-fat milk cheese, or any mixture thereof. Depending on the particular cheese flavors being used, low-calorie simulated cheese products can be made exhibiting various flavors including, but not limited to Cheddar, American, Colby, Emmentaler, Limberger Guyere, Camembert, Gouda, Edam, Cream, Tilsit, Trappist, Fontina, Provolone, Kaschkavall, Samso, Danbo, Maribo, and Fynbo.

ACIDULANTS

From about 0.05% to about 2% of a food grade acidulant is employed in the low-calorie simulated cheese products as herein described. The acidulant may be selected from the group consisting of, but not limited to, citric acid, malic acid, lactic acid, glutamic acid, glutamic acid hydrochloride, hydrochloric acid, or any mixture thereof.

EMULSIFYING SALTS

From about 0.2% to about 3% of a food grade emulsifying salt is employed in the low-calorie simulated cheese products of the present invention. The emulsifying salt may be chosen from the group consisting of, but not limited to, sodium hexametaphosphate, monosodium phosphate, disodium phosphate, trisodium phosphate, disodium pyrophosphate, tetrasodium pyrophosphate, sodium tripolyphosphate, sodium trimetaphosphate, and sodium tetrametaphosphate, sodium aluminum phosphate, or any mixture thereof.

MISCELLANEOUS INGREDIENTS

It may also be desired to add up to about 10% nonfatty adjuvant materials to the low-calorie simulated cheese products of the present invention. These adjuvant materials may include flavor extracts including, but not limited to, garlic, onion, dill, bacon, ham, sesame, peach, or strawberry. Another suitable variation of synthetic cheese products would be that resulting from the inclusion of chips or chunks of meat, fruit, or vegetables into the cheese products. It may also be desired to add a binding agent to the cheese products selected from the group consisting of certain emulsifiers, fibers, gums, pectin, or the like, or mixtures thereof. Various other adjuvant materials as defined herein may be satisfactorily included in the low-calorie simulated cheese products of the present invention.

PREPARATION OF LOW-CALORIE SYNTHETIC CHEESE PRODUCTS

The low-calorie simulated cheese products of the present invention are prepared by first blending together from about 5% to about 50% of protein source, from about 4% to about 35% of fatty substance; from about 30% to about 80% water; from about 0.2% to about 3% of an emulsifying salt; from about 0.2% to about 4% cheese flavors; as well as, if desired, up to about 10% adjuvant materials. This blending process is preferably done by heating the mixture to a temperature of about 32° C. (90° F.) to about 85° C. (185° F.), preferably while stirring, for a period of about 10 to about 20 minutes. After all the above ingredients have dissolved and a homogenous mix is obtained, the mixture is acidified using from about 0.05% to about 2% of a food grade acidulant. In conventional methods of producing synthetic cheese products, the acidulant may be added at any time during mixing the ingredients. However, when employing the low-calorie fatty materials described herein in the low-calorie simulated cheese product of the present invention, it is preferable to add the acidulant after all other ingredients are sufficiently mixed together and dissolved into a homogenous mix.

The invention described herein will be further illustrated by the following examples.

EXAMPLE 1

Low-Calorie Simulated Cheddar Cheese Containing Sucrose Fatty Acid Polyester

A. Preparation of the Sucrose Fatty Acid Polyester

A sucrose fatty acid polyester suitable for use as a low-calorie fatty material in a simulated cheese product of the present invention is prepared according to the following procedure.

Methyl esters of a fully hydrogenated (Iodine Value about 1) soy oil (90.8 kg), and 293 kg of a 6.8 wt. percent solution of potassium hydroxide in methanol are mixed in a stainless steel batch reactor. This mixture is then heated to about 145° F. (63° C.) with agitation for 1 to 3 hours at atmospheric pressure. During this time, a portion of the methyl esters are saponified to form soap.

An additional 592.5 kg of methyl esters of a fully hydrogenated soy oil (Iodine Value about 1) and a partially hydrogenated soy oil (Iodine Value about 107), blended in a 57:43 ratio, is then added to the soap mixture. Granular sucrose (136.2 kg) is added to the soap/ester mixture to give a 5:1 molar ratio of ester to sucrose. Potassium carbonate is then added to the mixture (approx. 0.5 wt. percent of the reaction mix) to catalyze the transesterification. This mixture is agitated and slowly heated at atmospheric pressure until the temperature reaches about 275° F. (135° C.). This is to remove the methanol. A vacuum is then pulled and the mixture agitated for up to 4 hours to form the mono-, di- and triesters of sucrose. Small quantities of tetra- and pentaesters are also formed during this stage. Additional methyl ester (950.7 kg) which has been preheated to 275° F. (135° C.) is added to bring and maintain the molar ratio of the esters to sucrose to 12:1. Additional potassium carbonate is then added to the mixture (approx. 0.5 wt. percent of the initial reaction mix). When the reaction conditions stabilize at 275° F. (135° C.), a nitrogen sparge is used to improve agitation and promote methanol stripping. This second reaction stage lasts approximately 4 to 12 hours.

The reaction mixture is then cooled under nitrogen to between 149° F. (65° C.) and 185° F. (85° C.). The crude reaction mixture is agitated with between 2 and 6 wt. percent water. The hydrated crude reaction mixture is passed through a centrifuge to separate a heavy and a light phase. The heavy phase which contains the soaps, excess sugars and potassium carbonate is discarded.

The light phase which contains methyl esters and the sucrose polyester is then dried to remove moisture at 176° F. (80° C.) under 70 mm Hg or less vacuum for 30 to 60 minutes. Filtrol 105 (1.0 wt. percent) is added and the mix is agitated at 167° F. (75° C.) to 185° F. (85° C.). The slurry is separated by filtration or other means until there is less than 0.1 wt. percent fines. The liquid is then passed through a 1 micromillimeter filter.

The refined and bleached reaction mix is then passed through a stainless steel wiped-film evaporator or other suitable equipment to distill off the bulk of the methyl esters. The distillation takes place at 392° F. (200° C.) to 455° F. (235° C.) under approximately 3 mm Hg of vacuum.

The sucrose polyester is then deodorized by passing downward through a stainless steel packed column deodorizer or other suitable device at 392° F. (200° C.) to 482° F. (250° C.) under a vacuum of about 5 mm Hg or less. Steam is introduced to the bottom of the column and passes counter-currently to the sucrose polyester.

Feed rates and temperature are adjusted until the methyl ester content of the sucrose polyester is below 1000 ppm. The mixture is then cooled to between 149° F. (65° C.) to 185° F. (85° C.) and passed through a 1 micromillimeter filter. The sucrose polyester is stored in clean stainless steel drums.

Sucrose polyester made according to this procedure typically has the composition and properties shown in Table 1. This product is solid at room temperature, non-digestible (zero calories), and does not produce laxative side effect.

TABLE 1

Chemical and Physical Characteristics of Sucrose Fatty Acid Polyester

| Fatty Acid Compositions | |
|---|---|
| $C_{16:0}$ | 10.7% |
| $C_{18:0}$ | 53.0% |
| $C_{18:1}$ | 20.2% |
| $C_{18:2}$ | 14.4% |
| $C_{18:3}$ | 0.9% |
| $C_{20:0}$ | 0.4% |
| Other | 0.4% |
| Iodine Value | 44.8 |
| Ester Distribution | |
| Octa | 83.2% |
| Hepta | 15.3% |
| Hexa | 0.1% |
| Penta and Lower | None Detected |
| Solid Fat Content | |
| 50° F. | 63.6% |
| 70° F. | 50.6% |
| 80° F. | 38.3% |
| 92° F. | 20.2% |
| 98.6° F. | 11.0% |
| 105° F. | 1.7% |
| Viscosity @ 100° F. 10 seconds$^{-1}$ @ 10 minutes | 31.0 poise |
| Liquid/Solid Stability @ 100° F. 486,000 G's @ 1 hour | >95% |

B. Preparation of Low-Calorie Simulated Cheddar Cheese 200 grams of tap water is placed into a jacketed KitchenAide mixer (Model #K45SS, The Hobart Manufacturing Co., Troy, Ohio). While stirring, 89 grams of low-calorie fatty material and 71 grams of partially hydrogenated soybean oil (Iodine Value=80; 20% solids content at 70° F. (21° C.)) are added. The mixture is maintained at 180°-200° F. by circulating a water/steam mixture through the jacket on the mixer. Next, 6 grams of sodium chloride and 7.5 grams of cheddar cheese flavor (Dariteen NCF 245, 20X, Haarmann & Reimer Corp., 70 Diamond Rd., Springfield, N.J. 07081) are added.

A mixture consisting of 122 grams calcium sodium caseinate (Alanate ® 262, New Zealand Milk Products, Inc., 1269 N. McDowell Blvd. Petaloma, Calif. 94952-1189), 2.5 grams sodium aluminum phosphate basic (KASAL, Stauffer Chemical Co., Westport, CT), and 0.12 grams of Beta-Carotene, 1% CSW (Hoffman-LaRoche, Inc., Nutley, N.J.) is prepared. This mixture is added continuously and rapidly to the mixture containing fatty material which is being heated in the KitchenAide mixer. The temperature is maintained at approx. 185° F. (85° C.). After 5 minutes of mixing, the cheese product is lump-free, smooth, and homogenous.

13 grams of anhydrous citric acid (fine granular, U.S.P., F.C.C. Pfizer Chemicals Division, Pfizer, Inc., New York, N.Y. 10017) is dissolved in 10 grams of water. The citric acid/water solution is added to the mixture in the mixer which then thickens appreciably but still maintains its smooth, uniform plastic appearance.

The cheese mixture is next poured into a cheese mold and cooled down rapidly by placing the mold in an ice water bath. The product is refrigerated at 40° F. (4.4° C.) for approximately 24 hours.

The above-described process is performed without difficulty and the resulting cheese product has the appearance, texture, and flavor of traditional full-fat Cheddar cheese.

EXAMPLE 2

Low-Calorie Simulated Cream Cheese Containing Tailored Triglycerides

A. Preparation of Tailored Triglycerides of Medium and Long Chain Fatty Acids as the Low-Calorie Fatty Material in Simulated Cheese Products A tailored triglyceride suitable for use as a low-calorie fatty material in a simulated cheese product of the present invention is prepared according to the following procedure:

2.0 parts of glycerol (Procter & Gamble Superol Glycerine), 11.2 parts of medium chain fatty acids (Procter & Gamble C810 Fatty Acid), and 1.0 part of long chain fatty acids (Sherex Hydrofol 2260 Fatty Acid) are added to a glass or stainless steel reaction vessel equipped with agitator, external heating, nitrogen sparger, and reflux condenser with 130° C. (266° F.) inlet oil. The typical compositions of the fatty acids are shown in Table 2.

TABLE 2

| P&G C810 Fatty Acid | | Sherex Hydrofol 2260 Fatty Acid | |
|---|---|---|---|
| $C_{6:0}$ | 4% | $C_{16:0}$ | 1% |
| $C_{8:0}$ | 56% | $C_{18:0}$ | 27% |
| $C_{10:0}$ | 39% | $C_{20:0}$ | 9% |
| $C_{12:0}$ | <1% | $C_{22:0}$ | 61% |
| | | $C_{24:0}$ | 2% |

The mixture is steadily heated with agitation and nitrogen sparging to bring the temperature to 250° C. (482° F.) over an 8-hour period. During this time, water of reaction is removed through the use of the reflux condenser which selectively condenses and returns to the reactor vaporized medium chain fatty acids. Reflux is discontinued and reaction temperature is maintained at 250° C. (482° F.) for an additional 12 to 14 hours before cooling to end the reaction. The reaction product mixture contains 13% unreacted fatty acids, 74% trimedium chain glycerol polyesters, 12% monolong-dimedium chain glycerol polyesters, and 1% dilong-monomedium chain glycerol polyesters.

The reaction product mixture is passed through a Pfaudler wiped-film evaporator to remove the unreacted fatty acids and trimedium chain glycerol polyesters as distillate, leaving the monolong-dimedium and dilong-dimedium chain glycerol polyesters in the bottom stream. Using the bottom stream as feed, two additional evaporator passes are made. The evaporator conditions for the three passes are shown in Table 3.

TABLE 3

| | Average Pressure (mm Hg) | Average Jacket Temperature (°C.) |
|---|---|---|
| 1st Pass | 0.9 | 279 (534° F.) |
| 2nd Pass | 0.6 | 288 (550° F.) |

TABLE 3-continued

| | Average Pressure (mm Hg) | Average Jacket Temperature (°C.) |
|---|---|---|
| 3rd Pass | 0.4 | 290 (554° F.) |

The typical composition of the bottom stream of the third evaporator pass, determined by internal standard gas chromatography is 3.3% trimedium chain glycerol polyesters, 88.1% monolong-dimedium chain glycerol polyesters, and 6.4% dilong-monomedium chain glycerol polyesters, having an overall fatty acid distribution of 26% $C_{8:0}$, 23% $C_{10:0}$, <1% $C_{12:0}$, 9% $C_{18:0}$, 1% $C_{20:0}$, 40% $C_{22:0}$, and 1% $C_{24:0}$. This low-calorie glycerol polyester is semi-solid at room temperature and has solidification points (titers) of 31° C. (87.8° F.), 33° C. (91.4° F.), and 38° C. (100.4° F.).

Before use as low-calorie fatty material, the glycerol polyester is freshly deodorized in a stainless steel batch deodorizer or other suitable device at 374° F. (190° C.) to 500° F. (260° C.) under a vacuum of about 0.25 mm Hg to about 5 mm Hg pressure with steam sparging. Deodorization is continued until the unreacted fatty acid content is below 500 ppm. The deodorizer contents are then cooled while using nitrogen sparging. After cooling to 149° F. (65° C.), the deodorizer is brought to atmospheric pressure. The glycerol polyester is stored in clean stainless steel drums.

B. Preparation of Low-Calorie Simulated Cream Cheese 251 grams of water is added into a jacketed Kitchen-Aide mixer. The temperature of the water in the mixer is maintained at 90°-100° F. by running a steam/water mixture through the jacket on the mixing bowl. 53 grams of calcium sodium caseinate (Alanate® 231, New Zealand Milk Products, Inc., 1269 N. McDowell Blvd., Petaluma, Calif. 94952-1189) is added slowly to the heated water. Next, a gum/salt mixture is added, while stirring, to the ingredients in the mixer. The gum/salt mixture consists of 4 grams sodium chloride, 2.5 grams xanthan gum (Keltrol F, Kelco, San Diego, Calif.), and 0.7 gram locust bean gum (Supercol 903) and 0.3 gram guar gum (Supercol OH) (both manufactured by Henkel Corp., Minneapolis, Minn.).

The temperature of the mixture in the mixer is raised to 140° F. (60° C.) and mixing continues until the mixture is lump free, approx. 15 minutes. Next, 172.5 grams of the low-calorie fatty material (synthesized according to Example 2, Part A) and 2 grams of mono- and di-glyceride (Durem 114, Durkee Industrial Foods, Cleveland, Ohio) is added to the continuously stirring mixture.

The temperature of the mixture is elevated to 165° F. (74° C.) and 10 grams of Dariteen L22 flavor (manufactured by Haarman & Reimer Corp., Springfield, N.J.) and 1.25 grams of Artificial Butter Paste #106180 (manufactured by Fritzsche Dodge & Olcott, New York, N.Y.) are added. The temperature of the mixture is held, while stirring, at 165° F. (74° C.) for another 30 minutes.

The mixture is then poured into a high shear mixer (Waring Blender, Model #133BL79, Waring Products Division, Dynamic Corporation of America, New Hartford, Conn.) and homogenized until the mixture is smooth in appearance, approx. 2 minutes.

The mixture is then returned to the KitchenAide mixer and the temperature is cooled to 60° F. (156° C.), while stirring, for approx. 5 minutes. The cooled mixture is next acidified to a pH of 4.6 by adding to it flavored lactic acid solution (Genlac Flavor System ND, Henkel Corp., Minneapolis, Minn.). Mixing continues for approx. 5 minutes until the resulting mixture is smooth in appearance.

The mixture is finally poured into a container and stored at 40° F. (4.4° C.) for 24 hours.

The resulting cream cheese product has a smooth texture, spreadable consistency, and good cream cheese flavor.

EXAMPLE 3

Preparation of Low-Calorie Simulated Cream Cheese Containing Sucrose Fatty Acid Polyester as the Low-Calorie Fatty Material Sucrose fatty acid polyester is prepared according to Example 1, Part A., and is used according to Example 2, Part B., in place of the tailored triglyceride (synthesized in Example 2, Part A.) as the low-calorie fatty material to prepare a low-calorie simulated cream cheese.

What is claimed is:

1. A low-calorie simulated cheese product comprising:
   (a) from about 5% to about 50% of protein obtained from a protein source selected from the group consisting of aged low-fat cheese, non-aged low-fat cheese; aged full-fat cheese, non-aged full-fat cheese; dry-powdered protein derived from fresh whole milk, skim milk, buttermilk, and cream; vegetable protein derived from vegetable proteinaceous materials; and mixtures thereof; wherein at least about 70% of the protein is obtained from a protein source selected from the group consisting of dry-powdered protein, vegetable protein, full-fat cheese, and mixtures thereof; and less than about 30% of the protein is selected from low-fat cheese;
   (b) from about 4% to about 35% of a fatty substance consisting essentially of from about 30% to about 100% of low-calorie fatty materials, with the balance being animal fat or vegetable fat, wherein when the low-calorie fatty material is a polyester of a sugar or sugar alcohol, the said sugar or sugar alcohol is one which has from 4 to 8 hydroxyl groups and at least four of the hydroxyl groups of the said sugar or sugar alcohol are esterified with fatty acids containing from 2 to about 24 carbon atoms, wherein when the low-calorie fatty material is a polyglycerol ester the said ester contains from about 5 to about 15 etherified glycerol units and at least 75% of the hydroxyl groups in said ester are esterified with fatty acids of from 2 to 24 carbon atoms and wherein when the low-calorie fatty material is a glyceride it is a tailored triglyceride in which the esterifying acids are a mixture of long chain and medium chain triglycerides wherein the composition of said mixture is from about 15% to about 70% by weight $C_6$ to $C_{10}$ saturated fatty acids and from about 10% to about 70% by weight $C_{17}$ to $C_{26}$ saturated fatty acids;
   (c) from about 30% to about 80% water;
   (d) from about 0.2% to about 4% cheese flavors;
   (e) from about 0.2% to about 3% of an emulsifying salt; and
   (f) from about 0.05% to about 2% of an acidulant.

2. The product of claim 1 wherein the amount of fatty substance in (b) is from about 30% to about 35%.

3. A product according to claim 1 or 2 wherein the low-calorie fatty material of (b) comprises tailored triglycerides esterified with mixtures of long chain and medium chain fatty acids and wherein the fatty acid composition of the tailored triglycerides is from about 15% to about 70% by weight $C_6$ to $C_{10}$ saturated fatty acids and from about 10% to about 70% by weight $C_{17}$ to $C_{26}$ saturated fatty acids.

4. A product according to claim 3 wherein the tailored triglycerides are comprised of not more than about 5% by weight $C_{6:0}$ fatty acid.

5. A product according to claim 3 wherein the tailored triglycerides are comprised of not more than about 7% by weight saturated $C_{24}$ and $C_{26}$ fatty acids.

6. A product according to claim 3 wherein the tailored triglycerides are comprised of not more than about 10% $C_{16:0}$ fatty acid.

7. A product according to claim 3 wherein the tailored triglycerides are comprised of not more than about 6% of fatty acids selected from the group consisting of $C_{18:1}$, $C_{18:2}$, and $C_{18:3}$ fatty acids, and mixtures thereof.

8. A product according to claim 3 wherein the tailored triglycerides are comprised of not more than about 3% fatty acids selected from the group consisting of $C_{12:0}$ (lauric) and $C_{14:0}$ (myristic), and mixtures thereof.

9. A product according to claim 2 wherein the composition additionally contains up to about 10% non-fatty adjuvant materials selected from the group consisting of vitamins or minerals; flavors or extracts; chips or chunks of meat, fruit, or vegetables; cream, whey, milk; sodium or potassium nitrate, nitrite, phosphate, ascorbate, or erythrobate; vinegar, citric acid, and malic acid; glucono delta lactone, salt, sucrose, dextrose, lactose, and corn syrup and corn syrup solids; seasonings and flavor enhancers; cereal, starch, vegetable flour, soy flour, soy protein; cream, non-fat milk, calcium reduced non-fat milk, whey, milk, egg albumin; dietary fiber; sweetening agents; binding agents; edible gums and hydrocolloids; or mixtures thereof.

10. A product according to claim 9 wherein the adjuvant materials are flavors or extracts selected from the group consisting of garlic, onion, dill, bacon, ham, sesame peach, strawberry, or mixtures thereof.

11. A product according to claim 9 wherein the adjuvant materials are various binding agents selected from the group consisting of emulsifiers, fibers, gums, pectin, or mixtures thereof.

12. A product according to claim 2 wherein the emulsifying salt of (e) is selected from the group consisting of sodium hexametaphosphate, monosodium phosphate, disodium phosphate, trisodium phosphate, disodium polyphosphate, sodium trimetaphosphate, sodium tetrametaphosphate, sodium aluminum phosphate, or mixtures thereof.

13. A product according to claim 2 wherein the acidulant of (f) is selected from the group consisting of citric acid, malic acid, lactic acid, phosphoric acid, glutamic acid, glutamic acid hydrochloride, hydrochloric acid, and mixtures thereof.

14. A product according to claim 2 wherein the low-calorie fatty material of (b) is a polyol fatty acid polyester.

15. A product according to claim 14 wherein the polyol fatty acid polyester is selected from the group consisting of esters of sugars, sugar alcohols, polyglycerols, and mixtures thereof.

16. A product according to claim 15 wherein the polyol fatty acid polyester is an ester of polyglycerol having at least 4 etherified glycerol units and at least 75% of its hydroxyl groups esterified with fatty acids.

17. A product according to claim 16 wherein the polyglycerol fatty acid polyester has from about 5 to about 15 etherified glycerol units.

18. A product according to claim 17 wherein the polyglycerol fatty acid polyester has from about 6 to about 10 etherified glycerol units.

19. A product according to claim 15 wherein the fatty acids of the polyol fatty acid polyester are selected from the group consisting of saturated and unsaturated fatty acids having from about 2 to about 24 carbon atoms, their geometric and positional isomers, or mixtures thereof.

20. A product according to claim 19 wherein each fatty acid group has from about 8 to about 24 carbon atoms.

21. A product according to claim 20 wherein each fatty acid group has from about 14 to about 18 carbon atoms.

22. A product according to claim 15 wherein the polyol fatty acid polyester has, at 37.8° C. (100° F.):
(a) a viscosity of at least about 2.5 poise at a shear rate of 10 seconds$^{-1}$ after 10 minutes of steady shear; and
(b) a liquid/solid stability of at least about 30%.

23. A product according to claim 22 wherein the polyol fatty acid polyester has, at 37.8° C. (100° F.)
(a) a viscosity of at least about 5 poise at a shear rate of 10 seconds$^{-1}$ after 10 minutes of steady shear; and
(b) a liquid/solid stability of at least about 50%.

24. A product according to claim 23 wherein the polyol fatty acid polyester has, at 37.8° C. (100° F.):
(a) a viscosity of at least about 10 poise at a shear rate of 10 seconds$^{-1}$ after 10 minutes of steady shear; and
(b) a liquid solid stability of at least about 70%.

25. A product according to claim 24 wherein the polyol fatty acid polyester has, at 37.8° C. (100° F.):
(a) a viscosity of at least about 15 poise at a shear rate of 10 seconds$^{-1}$ after 10 minutes of steady shear; and
(b) a liquid/solid stability of at least about 90%.

26. A product according to claim 15 wherein the polyol fatty acid polyester is selected from the group consisting of esters of sugars and sugar alcohols containing from 4 to 8 hydroxyl groups, and wherein the sugar or sugar alcohol fatty acid polyester has at least 4 fatty acid polyester groups.

27. A product according to claim 26 wherein the sugar alcohol of the sugar alcohol fatty acid polyester is selected from the group consisting of erythritol, xylitol, sorbitol, or mixtures thereof.

28. A product according to claim 26 wherein the sugar fatty acid polyester is selected from the group consisting of esters of sucrose, glucose, xylose, ribose, mannose, arabinose, galactose, fructose, sorbose, maltose, lactose, or mixtures thereof.

29. A product according to claim 28 wherein the sugar of the sugar fatty acid polyester is sucrose.

30. A product according to claim 29 wherein at least about 85% of the sucrose fatty acid polyesters are selected from the group consisting of octaesters, heptaesters, and hexaesters, and mixtures thereof.

31. A product according to claim 29 wherein no more than about 35% of the sucrose fatty acid polyesters are hexaesters or heptaesters, and at least about 60% of the esters are octaesters.

32. A product according to claim 29 wherein at least about 80% of the fatty acids of the sucrose fatty acid polyester are selected from the group consisting of $C_{16:0}$, $C_{18:1}$, $C_{18:2}$, $C_{22:0}$, $C_{22:1}$, their geometric and positional isomers, and mixtures thereof.

* * * * *